United States Patent
Sun et al.

(10) Patent No.: US 10,774,204 B2
(45) Date of Patent: Sep. 15, 2020

(54) CROSSLINKED POLYETHYLENE COMPOSITION

(71) Applicant: LG Chem, Ltd., Seoul (KR)

(72) Inventors: Ka Ram Sun, Daejeon (KR); In Gyu Park, Daejeon (KR); Youn Sun Nam, Daejeon (KR); Young Il Song, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 16/084,781

(22) PCT Filed: Oct. 30, 2017

(86) PCT No.: PCT/KR2017/012078
§ 371 (c)(1),
(2) Date: Sep. 13, 2018

(87) PCT Pub. No.: WO2018/088741
PCT Pub. Date: May 17, 2018

(65) Prior Publication Data
US 2019/0077941 A1    Mar. 14, 2019

(30) Foreign Application Priority Data
Nov. 10, 2016  (KR) .................. 10-2016-0149699

(51) Int. Cl.
| | | |
|---|---|---|
| C08F 10/02 | (2006.01) |
| C08J 3/24 | (2006.01) |
| C08K 5/00 | (2006.01) |
| C08K 5/01 | (2006.01) |
| C08K 5/053 | (2006.01) |
| C08K 5/06 | (2006.01) |
| C08K 5/08 | (2006.01) |
| C08K 5/14 | (2006.01) |
| C08K 5/25 | (2006.01) |
| C08K 5/37 | (2006.01) |
| C08L 23/06 | (2006.01) |

(52) U.S. Cl.
CPC .............. *C08L 23/06* (2013.01); *C08F 10/02* (2013.01); *C08J 3/242* (2013.01); *C08K 5/005* (2013.01); *C08K 5/0025* (2013.01); *C08K 5/01* (2013.01); *C08K 5/053* (2013.01); *C08K 5/06* (2013.01); *C08K 5/08* (2013.01); *C08K 5/14* (2013.01); *C08K 5/25* (2013.01); *C08K 5/37* (2013.01); *C08J 2323/06* (2013.01); *C08L 2203/20* (2013.01); *C08L 2207/066* (2013.01); *C08L 2312/00* (2013.01)

(58) Field of Classification Search
CPC ........ C08K 5/0025; C08K 5/005; C08K 5/01; C08K 5/053; C08K 5/06; C08K 5/08; C08K 5/14; C08K 5/25; C08K 5/37; C08F 10/02; C08J 3/242; C08L 23/06; C08L 2323/06; C08L 2203/20; C08L 2207/066; C08L 2312/00
See application file for complete search history.

(56) References Cited

U.S. PATENT DOCUMENTS

| | | |
|---|---|---|
| 5,536,777 A | 7/1996 | Ishikawa et al. |
| 8,329,797 B2 | 12/2012 | Eaton et al. |
| 9,589,700 B2* | 3/2017 | Sun .............. H01B 3/441 |
| 2007/0193643 A1 | 8/2007 | Jarvenkyla |
| 2010/0036031 A1 | 2/2010 | Herbst et al. |
| 2010/0222535 A1 | 9/2010 | Eaton |
| 2010/0234541 A1 | 9/2010 | Karbasi et al. |
| 2012/0305284 A1* | 12/2012 | Nilsson ............ H01B 3/20 |
| | | 174/110 SR |
| 2014/0113133 A1 | 4/2014 | Sun et al. |
| 2015/0267036 A1 | 9/2015 | Cree |
| 2015/0299494 A1 | 10/2015 | Sun et al. |
| 2016/0340492 A1 | 11/2016 | Sun et al. |

FOREIGN PATENT DOCUMENTS

| | | |
|---|---|---|
| CN | 101146859 A | 3/2008 |
| CN | 102597021 A | 7/2012 |
| CN | 103732677 A | 4/2014 |
| JP | H05062529 A | 3/1993 |
| JP | H07130221 A | 5/1995 |
| JP | H09115367 A | 5/1997 |
| JP | 2881596 B2 | 4/1999 |
| JP | 2000034386 A | 2/2000 |
| JP | 2001310980 A | 11/2001 |
| JP | 3459079 B2 | 10/2003 |
| JP | 2010506985 A | 3/2010 |
| JP | 5261145 B2 | 8/2013 |
| JP | 2016503101 A | 2/2016 |
| KR | 20000040595 A | 7/2000 |
| KR | 100295105 | 10/2001 |
| KR | 20080093723 A | 10/2008 |
| KR | 20100055411 A | 5/2010 |
| KR | 20100057805 A | 6/2010 |
| KR | 101084370 B1 | 11/2011 |

(Continued)

OTHER PUBLICATIONS

Seetec BC50 LDPE http://www.matweb.com/search/datasheettext. aspx?matguid=abeb36c5ce07456d92e407bfc9b8bc1f (Oct. 3, 2015).*
International Search Report for PCT/KR2017/012078 dated Feb. 7, 2018.
Extended European Search Report including Written Opinion for Application No. EP17870116.5 dated Apr. 10, 2019.
Chinese Search Report for Application No. 201780016874.8, dated Jul. 1, 2020, pp. 1-2.

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP

(57) ABSTRACT

The crosslinked polyethylene composition according to the present invention is characterized in that the migration of additives is inhibited due to low oil content of low density polyethylene, and thus, when preparing crosslinked polyethylene using the same, stable extrusion property is exhibited, thus reducing exterior deviation of the crosslinked polyethylene.

11 Claims, No Drawings

(56) References Cited

FOREIGN PATENT DOCUMENTS

| | | |
|---|---|---|
| KR | 20130020741 A | 2/2013 |
| KR | 101314010 B1 | 10/2013 |
| KR | 20150060719 A | 6/2015 |
| KR | 20160060176 A | 5/2016 |
| WO | 2007097511 A1 | 8/2007 |
| WO | 2012162019 A1 | 11/2012 |

* cited by examiner

CROSSLINKED POLYETHYLENE COMPOSITION

CROSS-REFERENCE TO RELATED APPLICATIONS

This application is a national phase entry under 35 U.S.C. § 371 of International Application No. PCT/KR2017/012078, filed Oct. 30, 2017, which claims priority to Korean Patent Application No. 10-2016-0149699 filed Nov. 10, 2016 the disclosures of which are herein incorporated by reference.

TECHNICAL FIELD

The present invention relates to a crosslinked polyethylene composition in which the migration of additives is inhibited during extrusion, thus enabling stable extrusion property, and crosslinked polyethylene prepared therefrom.

BACKGROUND

Crosslinked polyethylene is polyethylene modified such that excellent insulation property is maintained and thermally unstable defect is improved, and it has a three-dimensional network structure unlike linear polyethylene. The crosslinked polyethylene is known to have excellent heat resistance, durability, chemical resistance, flexibility, etc., and due to these properties, it is being widely used for electrical insulation of a power cable.

In general, a power cable is prepared by mixing polyethylene with a crosslinking agent and an antioxidant, etc., and extrusion molding. During the extrusion molding process, crosslinking of polyethylene is progressed. And, in addition to the crosslinking agent and antioxidant, other components, for example, a crosslinking accelerator, treeing inhibitor, etc. are used together, as necessary.

However, when preparing the power cable, the migration of additives occurs, which causes deviation of extrusion amount. The migration of additives means a phenomenon wherein additive components having relatively low molecular weight compared to polyethylene move to the surface during extrusion or after extrusion. Thus, extruded outer diameter deviation of a power cable is generated to cause product defect.

In order to minimize the migration of additives, previously, focus was on controlling of the kind of additives and added amount. Although this has the effect of reducing the migration of additives, the use of additives required according to the properties required in a power cable is limited, and thus, it cannot be a fundamental solution.

Therefore, the present inventors thoroughly examined the additive migration phenomenon, and as the result, confirmed that the oil content of polyethylene used for the preparation of crosslinked polyethylene is closely related to the migration of additives, and that by controlling the oil content, the migration of additives is inhibited, and completed the present invention.

Technical Problem

The present invention provides a crosslinked polyethylene composition in which migration of additives is inhibited during extrusion, thus enabling stable extrusion property.

The present invention further provides a crosslinked polyethylene prepared form the crosslinked polyethylene composition.

Technical Solution

The present invention provides a crosslinked polyethylene composition comprising 100 parts by weight of low density polyethylene(LDPE) having an oil extraction content of 1000 ppm or less, 0.1 to 10 parts by weight of a crosslinking agent, and 0.1 to 1.0 parts by weight of an antioxidant.

In order to prepare crosslinked polyethylene used for a power cable, etc., a crosslinked polyethylene composition comprising low density polyethylene and the additives of a crosslinking agent and an antioxidant is extruded. During this process, or after extrusion, the migration of the additives occurs to cause deviation of extrusion amount, etc. Previously, there have been attempts to inhibit the migration of additives by controlling the kind and added amount of additives, but this cannot be a fundamental solution to inhibit the migration of additives.

In the present invention, departing from the existing method of controlling the kind and added amount of additives, it was confirmed that the oil content of low density polyethylene used for the preparation of crosslinked polyethylene is closely related to the migration of additives.

Hereinafter, the present invention will be explained in detail.

Low Density Polyethylene

As used herein, the term 'low density polyethylene' is the main component of crosslinked polyethylene to be prepared in the present invention, and is commonly named as 'LDPE (low density polyethylene)'

Preferably, the density of the low density polyethylene is 0.87 to 0.94 g/cm$^3$.

And preferably, the melt index (MFR$_{2.16}$) of the low density polyethylene is 0.1 to 50 g/10 min.

And preferably, the weight average molecular weight of the low density polyethylene is 40,000 to 200,000.

The low density polyethylene may be, for example, ethylene homopolymer polymerized by a free radical initiation reaction in a high pressure tubular or autoclave, or ethylene copolymer prepared using a Ziegler Natta catalyst or metallocene catalyst under low pressure of 100 bars or less.

The metallocene catalyst may be, for example, an organometallic compound formed by the ligand binding of a cyclopentadiene derivative with transition metal such as titanium, zirconium, hafnium or vanadium, etc. of Group 4b, 5b or 6b, specifically Group 4b and 5b of the periodic table.

The ethylene copolymer may use $\alpha$-olefin having a carbon atom number of 3 or more as the comonomer, or use one or more selected from the group consisting of propylene, 1-butene, 1-pentene, 1-hexene and 1-octene as the comonomer.

Particularly, the low density polyethylene according to the present invention is characterized by the oil content of 1,000 ppmw or less. The oil content means the content of oil included in low density polyethylene, and for example, it means a value calculated by dividing the mass of the components extracted for 4 hours after putting 500 g of low density polyethylene in 2 L of water of 100° C., by 500 g. Although the oils are not necessarily limited hereto, they include non-reacted material according to the preparation of low density polyethylene, solvents, oligomer, etc.

Without being bound by any theory, since the oils included in low density polyethylene has lowered compatibility with additives, they induces the migration of additives. Thus, in the present invention, by controlling the oil content of low density polyethylene to 1,000 ppmw or less, the migration of additives can be inhibited.

Preferably, the oil content of the low density polyethylene 900 ppmw or less, 800 ppmw or less, 700 ppmw or less, 600 ppmw or less, 500 ppmw or less, 400 ppmw or less, or 300 ppmw or less. And, the smaller the oil content of the low density polyethylene, more preferable, and thus, the lower limit is theoretically 0 ppmw, and for example, it may be 1 ppmw or more, 10 ppmw or more, or 100 ppmw or more.

The oil content of the low density polyethylene may be controlled by controlling the preparation conditions of low density polyethylene. For example, by controlling the reaction catalyst, reaction time, reaction temperature, reaction solvents at the time of preparation of low density polyethylene, the oil content may be controlled. For example, when polymerizing low density polyethylene, compressor oil may have an influence on the oil content, and the oil content of the product using synthetic oil may be lower than that using mineral oil. And, when polymerizing low density polyethylene, if the reaction pressure is increased, the oil content may be increased.

Crosslinking Agent

The crosslinked polyethylene composition according to the present invention comprises a crosslinking agent, in addition to the low density polyethylene.

The crosslinking agent may be included in the content of 0.1 to 10 parts by weight, preferably 1.0 to 3.0 parts by weight, based on 100 parts by weight of the low density polyethylene.

The crosslinking agent is to induce a crosslinking reaction during the extrusion of low density polyethylene, and is not specifically limited as long as it is used for the preparation of crosslinked polyethylene. For example, it may be one or more selected from the group consisting of dicumyl peroxide (DCP), benzoyl peroxide, lauryl peroxide, tert-butyl cumyl peroxide, di(tert-butyl peroxy isopropyl) benzene, 2,5-dimethyl-2,5-di(tert-butyl peroxy)hexane, and di-tert-butyl peroxide.

Antioxidant

The crosslinked polyethylene composition according to the present invention comprises an antioxidant, in addition to the low density polyethylene. The antioxidant may be included in the content of 0.1 to 1.0 parts by weight, based on 100 parts by weight of the low density polyethylene.

The antioxidant is not specifically limited as long as it is used for the preparation of crosslinked polyethylene. For example, hindered phenol-type antioxidants may be used. For example, one or more selected from the group consisting of 4,4'-thiobis(2-t-butyl-5-methylphenol), 4,6-bis(octylthiomethyl)-o-cresol, 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, 1,3,5-tris(4-t-butyl-3-hydroxy-2,6-xylyl)methyl-1,3,5-triazine-2,4,6-(1H,3H,5H)-trione and dioctadecyl 3,3'-thiodipropionate may be used.

Crosslinking Accelerator

And, the crosslinked polyethylene composition according to the present invention may further comprise a crosslinking accelerator. The crosslinking accelerator may improve the crosslinking degree of low density polyethylene to further inhibit the migration of additives.

Particularly, in case the oil content of the low density polyethylene is 500 ppmw or more, the crosslinking accelerator may be included to inhibit the migration of additives.

As the crosslinking accelerator, 2,4-diphenyl-4-methyl-1-pentene or 1,4-hydroquinone may be used.

The crosslinking accelerator may be included in the content of 0.1 to 5 parts by weight, more preferably 0.1 to 1.0 parts by weight, or 0.2 to 0.5 parts by weight, based on 100 parts by weight of the low density polyethylene.

Treeing Inhibitor

And, the crosslinked polyethylene composition according to the present invention may further comprise a treeing inhibitor. Particularly, in case the oil content of the low density polyethylene is 500 ppmw or more, the treeing inhibitor may be included to inhibit the migration of additives.

As the treeing inhibitor, polyethylene glycol with a weight average molecular weight of 5,000 to 70,000 may be used. The treeing inhibitor may be included in the content of 0.1 to 5 parts by weight, preferably 0.1 to 1.0 parts by weight, based on 100 parts by weight of the low density polyethylene.

Crosslinked Polyethylene

The present invention also provides crosslinked polyethylene prepared form the above explained crosslinked polyethylene composition.

A method for preparing crosslinked polyethylene with the crosslinked polyethylene composition may comprise the steps of kneading and extruding the above explained crosslinked polyethylene composition; and crosslinking the extrudate at a temperature higher than the decomposition temperature of the crosslinking agent.

The kneading and extrusion are not specifically limited as long as it is a common kneading and extrusion method of a crosslinked polyethylene composition, and for example, it may be conducted by preparing a master batch comprising the remaining components except low density polyethylene, and then, introducing it together with low density polyethylene, etc. or separately into an extruder.

For the crosslinking, the extrudate (for example, in the form of a pellet) may be mixed with a crosslinking agent using a twin screw kneader, etc., as necessary, and then, the mixture may be extrusion molded with an extruder at a predetermined temperature for a predetermined time. The extruder may be, for example, a twin extruder, or a single screw extruder with kneading function, etc.

And, the crosslinked polyethylene according to the present invention may be used as an insulation layer of a power cable. For example, the power cable may comprise a conductor; an insulation layer consisting of the crosslinked polyethylene according to the present invention, surrounding the conductor; and a coating layer surrounding the insulation layer.

Particularly, as explained above, the crosslinked polyethylene composition according to the present invention has stable extrusion property because the migration of additives is inhibited, and thus, the extruded crosslinked polyethylene has small exterior deviation.

Specifically, when measuring the thickness of an insulation layer during the extrusion of a cable with an X-ray outer diameter measuring instrument, the extruded exterior deviation may be ±0.5 mm or less, more preferably ±0.4 mm or less, ±0.3 mm or less, or ±0.2 mm or less.

And, since the migration of additives is inhibited, the methanol extraction content of the crosslinked polyethylene is low. The methanol extraction content means the content of methanol extraction components included in the crosslinked polyethylene, and for example, it means a value calculated by dividing the mass of the components extracted for 5 minutes after putting 50 g of crosslinked polyethylene in 100 mL of methanol, by 50 g.

Preferably, the methanol extraction content may be 1000 ppmw or less, more preferably 900 ppmw or less, 800 ppmw or less, 700 ppmw or less, 600 ppmw or less, 500 ppmw or less, or 400 ppmw or less. And, smaller the methanol extraction content, more preferable, and thus, the lower limit is theoretically 0 ppmw, and for example, it may be 1 ppmw or more, 10 ppmw or more, or 100 ppmw or more.

As explained above, the crosslinked polyethylene composition according to the present invention is characterized in that the migration of additives is inhibited due to low oil content of low density polyethylene, and thus, when preparing crosslinked polyethylene using the same, stable extrusion property is exhibited, thus reducing exterior deviation of the crosslinked polyethylene.

DETAILED DESCRIPTION OF THE EMBODIMENTS

Hereinafter, preferable examples are presented for better understanding of the present invention. However, these examples are presented only as the illustrations of the present invention, and the scope of the present invention is not limited thereby.

Examples 1~5 and Comparative Examples 1~2

With the components and contents (parts by weight) described in the following Table 1, each component was kneaded in a Banbury mixer of 120~140° C., and then, granulated in the form of pellets. Meanwhile, in order to measure the oil extraction content of each low density polyethylene used, 500 g of low density polyethylene was put in 2 L of water of 100° C. and left for 4 hours, and then, cooled for 2 hours, and the concentration of extracted components was measured, and the results were shown in the following Table 1.

EXPERIMENTAL EXAMPLE

Using the pellets prepared in Examples and Comparative Examples, experiments were conducted as follows.

1) Methanol Extraction Content 50 g of the pellets were put in a beaker, and then, 100 mL of methanol was put, and the mixture was stirred for 5 minutes. The methanol solution was filtered with a 10 um PTFE, and vacuum dried to remove methanol, and then, the weight was measured at room temperature. The obtained value was divided by 50 g to calculate the methanol extraction content.

2) Exterior Deviation

The following 3 kinds of materials were simultaneously extruded in order onto the peripheral part of a conductor (cross section (circular) 630 $mm^2$), and pressurized and heated at a temperature of 380° C. and a pressure of 10 $kg/cm^2$, under nitrogen atmosphere, to prepare a cable. Here, the thickness of an insulation layer was controlled to 9 mm, the thickness of the internal semi-conductive layer was controlled 0.6 mm, and the thickness of external semi-conductive layer was controlled to 0.8 mm. The thickness of the insulation layer of the prepared cable was measured with an X-ray outer diameter measuring instrument to measure the thickness deviation.

A. The internal semi-conductive layer was formed using a composition comprising ethylene-acetic acid vinyl copolymer, an organic peroxide crosslinking agent, carbon black, and an antioxidant (semi-conductive resin composition).

B. The insulation layer was formed using the pellets prepared in Examples and Comparative Examples.

C. The external semi-conductive layer was formed using the same semi-conductive resin composition as for the internal semi-conductive layer.

The measurement results were shown in the following Table 1.

TABLE 1

|  | Example 1 | Example 2 | Example 3 | Example 4 | Example 5 | Comparative Example 1 | Comparative Example 2 |
| --- | --- | --- | --- | --- | --- | --- | --- |
| low density polyethylene[1] | 100 | 100 | 100 | 100 | 100 | 100 | 100 |
| Crosslinking agent[2] | 2.0 | 2.0 | 2.0 | 2.0 | 2.0 | 2.0 | 2.0 |
| antioxidant 1[3] | 0.2 | 0.2 | 0.1 | 0.3 | 0.1 | 0.2 | 0.3 |
| antioxidant 2[4] | — | — | — | 0.1 | — | — | 0.1 |
| Curing accelerator[5] | — | — | 0.4 | — | 0.4 | — | — |
| Treeing inhibitor[6] | — | — | — | 0.5 | — | — | — |
| Oil extraction content (ppmw) | 240 | 600 | 600 | 820 | 820 | 920 | 920 |
| Methanol extraction content (ppmw) | 350 | 800 | 600 | 350 | 500 | 1,000 | 1,200 |
| Extruded outer diameter deviation (mm) | ±0.2 | ±0.4 | ±0.2 | ±0.2 | ±0.2 | ±0.5 | ±0.6 |

[1]Example 1(SEETEC BC500, LG Chem., using synthetic oil)
Examples 2 and 3(SEETEC BC500, LG Chem., using mineral oil)
Examples 4, 5 and Comparative Examples 1, 2(LUTENE™ CB2030, LG Chem.)
[2]dicumyl peroxide
[3]4,4'-thiobis(2-t-butyl-5-methylphenol)
[4]4,6-bis(octylthiomethyl)-o-cresol
[5]2,4-diphenyl-4-methyl-1-pentene
[6]polyethylene glycol As shown in Table 1, it was confirmed that, in the case of Example 1 with the smallest oil extraction content of low density polyethylene, the methanol extraction content and extruded outer diameter deviation were also small. And, in the case of Example 2, since the oil extraction content of low density polyethylene is larger than Example 1, the methanol extraction content and extruded outer diameter deviation slightly increased, but by additionally comprising a curing accelerator as in Example 3, they could be lowered. Also, in the case of Examples 4 and 5, although the oil extraction contents of low density polyethylene are rather high, by additionally comprising a curing accelerator or a treeing inhibitor, the methanol extraction content and extruded outer diameter deviation were shown to be low.

To the contrary, in the case of Comparative Examples 1 and 2 wherein the oil extraction content of low density polyethylene is high and additional components other than a crosslinking agent and an antioxidant are not included, the methanol extraction content and extruded outer diameter deviation were shown to be high.

The invention claimed is:

1. A crosslinked polyethylene composition comprising:
   100 parts by weight of low density polyethylene(LDPE) having an oil content of 700 ppm or less,
   0.1 to 10 parts by weight of a crosslinking agent, and
   0.1 to 1.0 parts by weight of an antioxidant, and
   wherein the oil content is measured and calculated by dividing the mass of the components extracted for 4 hours after putting 500 g of the LDPE in 2 L of water of 100° C., by 500 g.

2. The crosslinked polyethylene composition according to claim 1, wherein the oil content of the low density polyethylene is 300 ppm or less.

3. The crosslinked polyethylene composition according to claim 1, wherein the crosslinking agent is one or more selected from the group consisting of dicumyl peroxide, benzoyl peroxide, lauryl peroxide, t-butyl cumyl peroxide, di(t-butyl peroxyisopropyl)benzene, 2,5-dimethyl-2,5-di(t-butyl peroxy)hexane, and di-t-butyl peroxide.

4. The crosslinked polyethylene composition according to claim 1, wherein the antioxidant is one or more selected from the group consisting of 4,4'-thiobis(2-t-butyl-5-methylphenol), 4,6-bis(octylthiomethyl)-o-cresol, 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, 1,3,5-tris(4-t-butyl-3-hydroxy-2,6-xylyl)methyl-1,3,5-triazine-2,4,6-(1H,3H,5H)-trione and dioctadecyl 3,3'-thiodipropionate.

5. The crosslinked polyethylene composition according to claim 1, further comprising 0.1 to 5 parts by weight of a crosslinking accelerator.

6. The crosslinked polyethylene composition according to claim 5, wherein the crosslinking accelerator is 2,4-diphenyl-4-methyl-1-pentene, or 1,4-hydroquinone.

7. The crosslinked polyethylene composition according to claim 1, further comprising 0.1 to 5 parts by weight of a treeing inhibitor.

8. The crosslinked polyethylene composition according to claim 7, wherein the treeing inhibitor is polyethylene glycol.

9. The crosslinked polyethylene composition according to claim 1, wherein the methanol extraction content of the crosslinked polyethylene is 900 ppm or less.

10. A cable comprising the crosslinked polyethylene composition according to claim 1.

11. The cable according to claim 10, wherein the extruded outer diameter deviation of a cable prepared from the crosslinked polyethylene is ±0.5 mm or less.

* * * * *